United States Patent
Tynan, Jr. et al.

[11] Patent Number: 5,942,299
[45] Date of Patent: Aug. 24, 1999

[54] BILAYER ADHESIVE SYSTEM FOR REINFORCED STRAPPING TAPE

[75] Inventors: John K. Tynan, Jr., Port Huron; Richard W. St. Coeur, Marysville; Maria E. S. Kuznia, Goodells, all of Mich.

[73] Assignee: Intertape Polymer Group, Inc., Marysville, Mich.

[21] Appl. No.: 08/800,046

[22] Filed: Feb. 14, 1997

Related U.S. Application Data

[60] Provisional application No. 60/013,916, Feb. 20, 1996.

[51] Int. Cl.$^6$ .................................................. C09J 5/02
[52] U.S. Cl. ..................... 428/40.1; 428/41.9; 428/114; 428/349; 428/354; 428/355 BL; 428/356; 428/906
[58] Field of Search ........................ 428/40.1, 41.9, 428/356, 114, 492, 493, 494, 495, 906, 349, 347, 346, 354, 355 BL; 156/276, 338

[56] References Cited

U.S. PATENT DOCUMENTS

| | | | |
|---|---|---|---|
| 2,292,024 | 8/1942 | Dreher | 40/140 |
| 2,444,830 | 6/1948 | Kellaren et al. | 154/136 |
| 2,607,709 | 8/1952 | Simpson et al. | 117/68.5 |
| 2,753,285 | 7/1956 | Pahl | 428/356 |
| 2,927,868 | 3/1960 | Revoir | 428/356 |
| 2,953,475 | 9/1960 | Bergstedt | 428/356 |
| 3,027,337 | 3/1962 | Tritsch | 428/356 |
| 3,197,326 | 7/1965 | Webber | 428/356 |
| 3,850,786 | 11/1974 | Jeffries et al. | 161/164 |
| 4,260,659 | 4/1981 | Gobran | 428/217 |
| 4,379,806 | 4/1983 | Korpman | 428/354 |
| 4,576,854 | 3/1986 | Kurahashi | 428/215 |
| 4,581,281 | 4/1986 | Gerace | 428/215 |
| 4,902,480 | 2/1990 | Keys | 428/356 |
| 5,591,498 | 1/1997 | Arakawa | 428/40.1 |
| 5,593,759 | 1/1997 | Vargas et al. | 428/200 |

FOREIGN PATENT DOCUMENTS

| | | | |
|---|---|---|---|
| 2249148 | 5/1975 | France . | |
| 2368527 | 5/1978 | France . | |
| 59-210984 | 11/1984 | Japan | 428/356 |
| 0233178 | 11/1985 | Japan . | |
| 2233798 | 10/1987 | Japan . | |
| 6469336 | 3/1989 | Japan . | |
| 1279988 | 11/1989 | Japan . | |
| 4103684 | 4/1992 | Japan . | |
| 4161473 | 6/1992 | Japan . | |
| 690333 | 4/1953 | United Kingdom . | |

*Primary Examiner*—Nasser Ahmad
*Attorney, Agent, or Firm*—Thompson Hine & Flory LLP

[57] ABSTRACT

An adhesive tape comprising a foundation layer including a thermoplastic resin applied to the surface of a support and a layer of a natural rubber pressure sensitive adhesive on said foundation layer; and a reinforced strapping tape for use in packaging appliances wherein the reinforced strapping tape comprises a support; a release agent on one surface of the support; a laminating adhesive on the opposite surface of the support; reinforcing strands applied on the laminating adhesive; a hot melt pressure sensitive adhesive applied on the reinforcing strands; and a natural rubber pressure sensitive adhesive applied on the hot melt pressure sensitive adhesive.

18 Claims, 7 Drawing Sheets

BILAYER ADHESIVE SYSTEM FOR REINFORCED STRAPPING TAPE

This application claims priority from U.S. Provisional Application No. 60/013,916 filed Feb. 20, 1996.

BACKGROUND OF THE INVENTION

The present invention relates to a bilayer adhesive system for use in natural rubber adhesive tapes and particularly for use in a reinforced strapping tape for use in the appliance packaging industry.

The suitability of any adhesive tape for use in a particular application is a function of several factors. Properties of the adhesive such as peel strength, tensile, tack and the like are important factors, but other properties of the tape and its construction also affect its usefulness including the flexibility, softness and elastomeric character of the adhesive layer.

Reinforced, pressure sensitive adhesive tapes (PSAT) have been used in the appliance packaging industry for many years. Typically, such tapes are constructed from a backing substrate having, on its surface, a layer of reinforcing strands and a pressure sensitive adhesive (PSA), particularly a natural rubber-based pressure sensitive adhesive (NRPSA). These reinforced, natural rubber adhesive tapes can be applied to a variety of appliance surfaces (adherends) with little or no surface preparation. However, one important disadvantage of these products in particular and natural rubber pressure sensitive adhesive tapes in general is their relatively high manufacturing cost. Due to the relatively high coating weights associated with reinforced, strapping tapes with NRPSAs and because natural rubber adhesives must be cast from a solvent at relatively low solids, the adhesive must be coated at slow line speeds (e.g., about 150 fpm) to avoid breaching the lower explosive level (LEL) of solvent vapor in the drying ovens of typical coating lines. While one solution to this problem is to coat the natural rubber adhesive in multiple layers in tandem, this increases processing equipment costs, e.g. multiple coating heads and/or additional dryer capacity.

Attempts have been made to construct tapes using hot melt pressure sensitive adhesives (HMPSA). Typically, reinforced strapping tapes are constructed by applying to a backing support two adhesive layers, e.g., an acrylic laminating pressure sensitive adhesive layer and a top hot melt pressure sensitive layer. The acrylic layer, which is typically deposited from an emulsion, bonds the reinforcing strands to the backing substrate. The hot melt pressure sensitive adhesive is applied as a top coat which fills the spaces between the reinforcing strands and ensures an uninterrupted adhesive layer atop the strands. While the raw material cost of the reinforced hot melt adhesive is, on average, higher than that of the natural rubber-based reinforced pressure sensitive adhesive, less of it is needed (typically 30 lbs. per 3000 ft$^2$ vs. 48 lbs.). Furthermore, it can be applied in tandem with the acrylic emulsion adhesive at relatively high line speeds, when compared to solvent cast natural rubber adhesives (typically 600 fpm vs. 150 fpm) at a lower processing cost which translates into a lower total cost than the natural rubber-based tape.

One disadvantage with hot melt pressure sensitive adhesive tape is that it requires greater care to apply to the adherend, i.e., it requires a dust-free, grease-free surface and careful rub-down. Also, the hot melt pressure sensitive adhesive does not exhibit consistently high wet-tack and adhesion to and transfer-free removal from all of the adherends encountered in the appliance packaging industry.

Accordingly, there is a need in the industry for a pressure sensitive adhesive tape and, more particularly, for a reinforced strapping tape which exhibits the adhesion wet-tack characteristics of natural rubber adhesives and which can be produced at a lower total cost.

SUMMARY OF THE INVENTION

It has now been found that the robust adhesive properties of a natural rubber adhesive can be provided with reduced manufacturing cost if a bilayer adhesive system is employed which includes a layer of natural rubber adhesive atop a thermoplastic foundation layer. By using natural rubber adhesive, robust adhesive properties are provided in the tape while the thermoplastic foundation layer provides internal body and structure while obviating the need to cast a thick natural rubber adhesive layer from a solvent. The thermoplastic foundation layer can be formulated to provide a bilayer structure which mimics the dynamic mechanical properties of the natural rubber based adhesive layer or to improve over the properties and function of a tape having a pressure sensitive adhesive monolayer. Thus, replacing the portion of the natural rubber adhesive layer adjacent the substrate has the advantages of both reducing manufacturing cost and introducing an additional degree of freedom into the design of a natural rubber adhesive tape that enables further optimization of tape function.

Accordingly, a pressure sensitive adhesive tape in accordance with the present invention is constructed of a support having a first surface and a second surface;

a layer of a release agent provided on said first surface of the support, i.e., the backside of the tape;

a foundation layer containing a hot melt thermoplastic coating provided on said second surface, i.e., the front side of the tape; and a layer containing a natural rubber pressure sensitive adhesive overlying said layer of said thermoplastic resin.

In accordance with a particular embodiment of the invention, a reinforced pressure sensitive adhesive strapping tape is provided containing a support having a first surface and a second surface;

a layer containing a release agent on the first surface of the support;

a first adhesive layer containing a laminating adhesive on the second surface of the support;

a layer of reinforcing strands on the top of the first adhesive layer;

a second adhesive layer containing a hot melt pressure sensitive adhesive on top of the reinforcing strands; and a third adhesive layer containing a natural rubber pressure sensitive adhesive on top of the second adhesive layer.

DETAILED DESCRIPTION OF THE INVENTION

Figure 1:
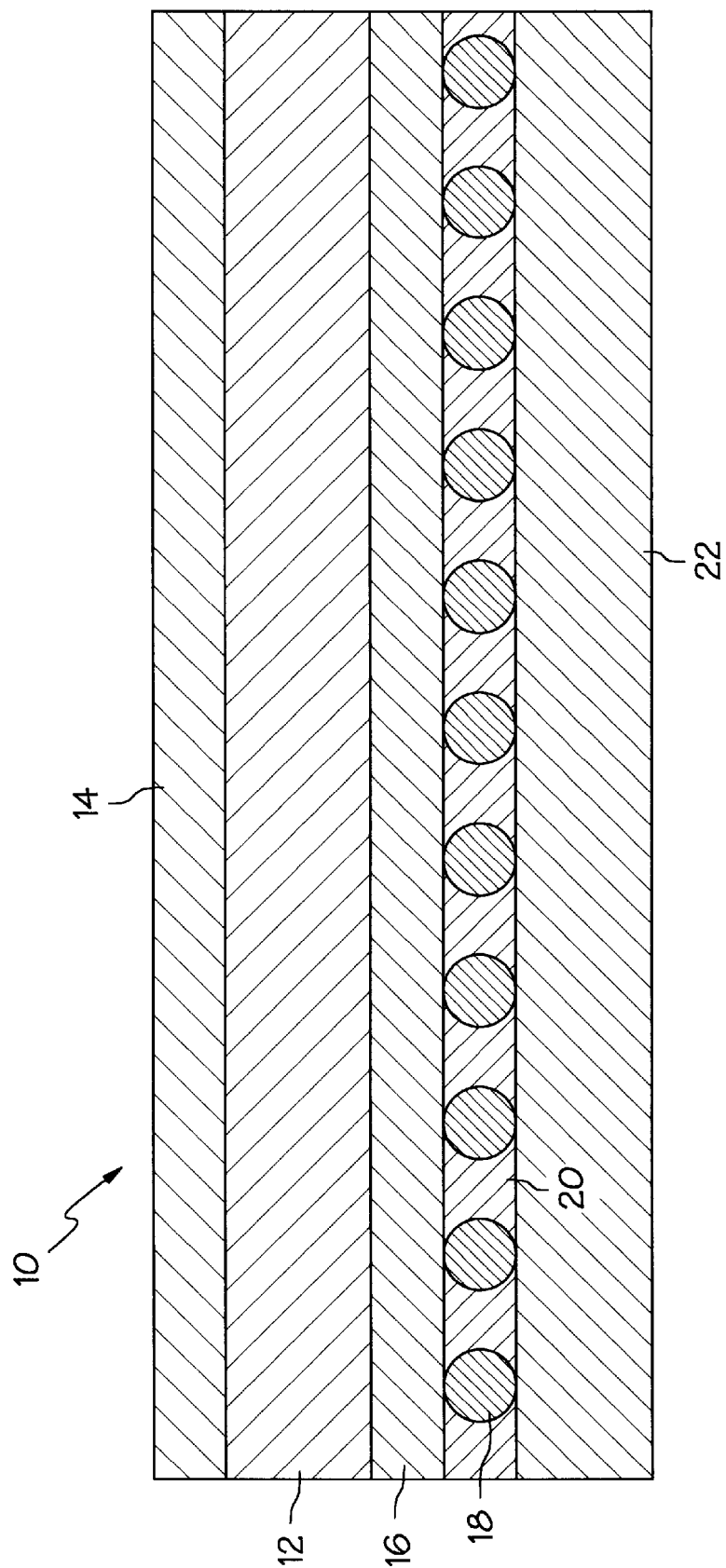
FIG. 1 is a cross-sectional schematic view of a reinforced, pressure sensitive adhesive tape in accordance with one embodiment of the present invention.

The term "hot melt" as used herein refers to a composition that is essentially solventless which is coated at an elevated temperature and cooled to set the coating. A reinforced strapping tape 10 in accordance with one embodiment of the present invention is illustrated in FIG. 1 and comprises a support 12 having on one surface thereof a release agent 14 and on the opposite side thereof a layer of a laminating adhesive 16. A layer of reinforcing strands 18 is laid on the surface of the laminating adhesive layer 16 and a thermoplastic composition such as a hot melt pressure sensitive adhesive 20 is applied over the reinforcing layer such that it surrounds and penetrates the spaces among the reinforcing strands 18 and provides a continuous adhesive layer overlying the reinforcing strands 18. A layer of natural rubber adhesive 22 is coated on top of the hot melt pressure sensitive adhesive 20. Since only a thin layer of the natural rubber pressure sensitive adhesive 22 is applied, the level of solvent vapor liberated while coating the natural rubber adhesive is drastically reduced allowing the natural rubber adhesive 22 to be applied at speeds higher than can be employed using a natural rubber adhesive alone in the absence of a hot melt pressure sensitive adhesive.

The backing support of the present reinforced strapping tape may be any of the materials commonly used in the industry and typically includes biaxially oriented polypropylene (BOPP), polyethylene terephthalate (PET), machine direction oriented polypropylene (MOPP), paper, polyethylene, and the like. Preferably, the backing support is polyethylene terephthalate or biaxially oriented polypropylene.

Any conventional release agent can be used to provide the release properties. Representative examples of the release agents useful in the present invention include polyvinyl octadecyl carbamate (PVODC); a $C_{14}$–$C_{18}$ fatty acid coordinated with a transition metal such as chromium; the reaction product of a di-ω-organo functional dimethylsiloxane oligomer having a terminal active hydrogen, a carboxyl group-bearing monomer, and a diisocyanate; and terpolymers of stearyl methacrylate, acrylonitrile and vinyl pyrrolidone. Typically, the release agent is cast from a solvent system such as toluene, isopropylalcohol, water, or mixtures thereof in which the release agent is present at about 1–7%. In a preferred aspect of the invention, 0.5–3% PVODC in toluene is used to apply the release agent. The coverage of the release agent will vary with its selection and the adhesive which it faces. Coverages of about 1 to 5 $g/cm^2$ wet coating are common.

In accordance with the invention, a thermoplastic foundation layer is provided in the tape which replaces a portion of the thickness of the natural rubber adhesive. A particularly convenient thermoplastic layer is a layer containing a thermoplastic rubber. It has been found that the tape can be optimized for use in certain applications by modifying the properties of the thermoplastic foundation layer. For example, in certain applications, a softer, lower Tg foundation layer may be required while in others a more rigid, higher foundation layer may be desired.

While the thermoplastic layer need not be an adhesive, hot melt adhesive compositions have been found to be particularly convenient to use as the foundation layer. Hot melt adhesives are generally thermoplastic materials which contain as essential constituents a thermoplastic polymer and a tackifier. Hot melt adhesives normally are homogeneous mixtures and are manufactured by compounding, i.e., melt blending the thermoplastic polymer with the tackifier and antioxidants and/or other stabilizing additives. The tackifier can be used in an amount of about 80 to 300 parts per 100 parts of the thermoplastic polymer. The molten mixture then is coated on a substrate.

Typically the thermoplastic foundation layer is formed from a composition containing a thermoplastic resin wherein the resin is an A-B-A block copolymer, where A represents a thermoplastic polystyrene and B represents a rubber midblock of polyisoprene, polybutadiene, or poly(ethylene/butylene). Useful thermoplastic rubbers are available from Shell Development Co., Houston, Tex., under the tradename Kraton D or Kraton G or from Dexco Polymers under the tradename Vector 4113. Typically, the foundation layer is formulated by blending the thermoplastic resin with a tackifying resin so as to provide a composition which melts at a temperature of about 130° C. to 200° C. and has viscosity of less than 100,000 cps at 500° F.

In a preferred aspect of the invention, the hot melt pressure sensitive adhesive includes a styrene-isoprene-styrene block copolymer (S-I-S) system a tackifier resin such as a blend of an aliphatic olefin-derived resin and a polyterpene resin, naphthenic or paraffinic oil, and antioxidants. These ingredients are processed through an extruder at high shear to melt all the ingredients into a homogeneous mixture. A preferred HMPSA contains about 100 parts of Vector 4113 S-I-S block copolymer, about 80–300 parts of an aliphatic olefin-derived resin blended with a polyterpene resin, 5–30 parts of a naphthenic oil and 1 part of an antioxidant.

While the invention is described above with respect to the use of an HMPSA as the foundation layer, it will be appreciated that other hot melt thermoplastic compositions could also be used including compositions in which the thermoplastic resin is an ethylene vinylacetate copolymer, a polyester or a polyamide. One approach which can be used in formulating a thermoplastic elastomeric composition for use as the foundation layer, is to design a formulation which, when coupled with a natural rubber adhesive layer mimics the dynamic mechanical properties of a natural rubber adhesive layer alone. In accordance with one embodiment, the thermoplastic foundation layer is formulated so as to provide a bilayer structure which has G' and, still more preferably, G' and G" versus temperature profiles which are substantially similar to a natural rubber adhesive layer over a temperature range of about −20° to 110° C.

Figure 2:
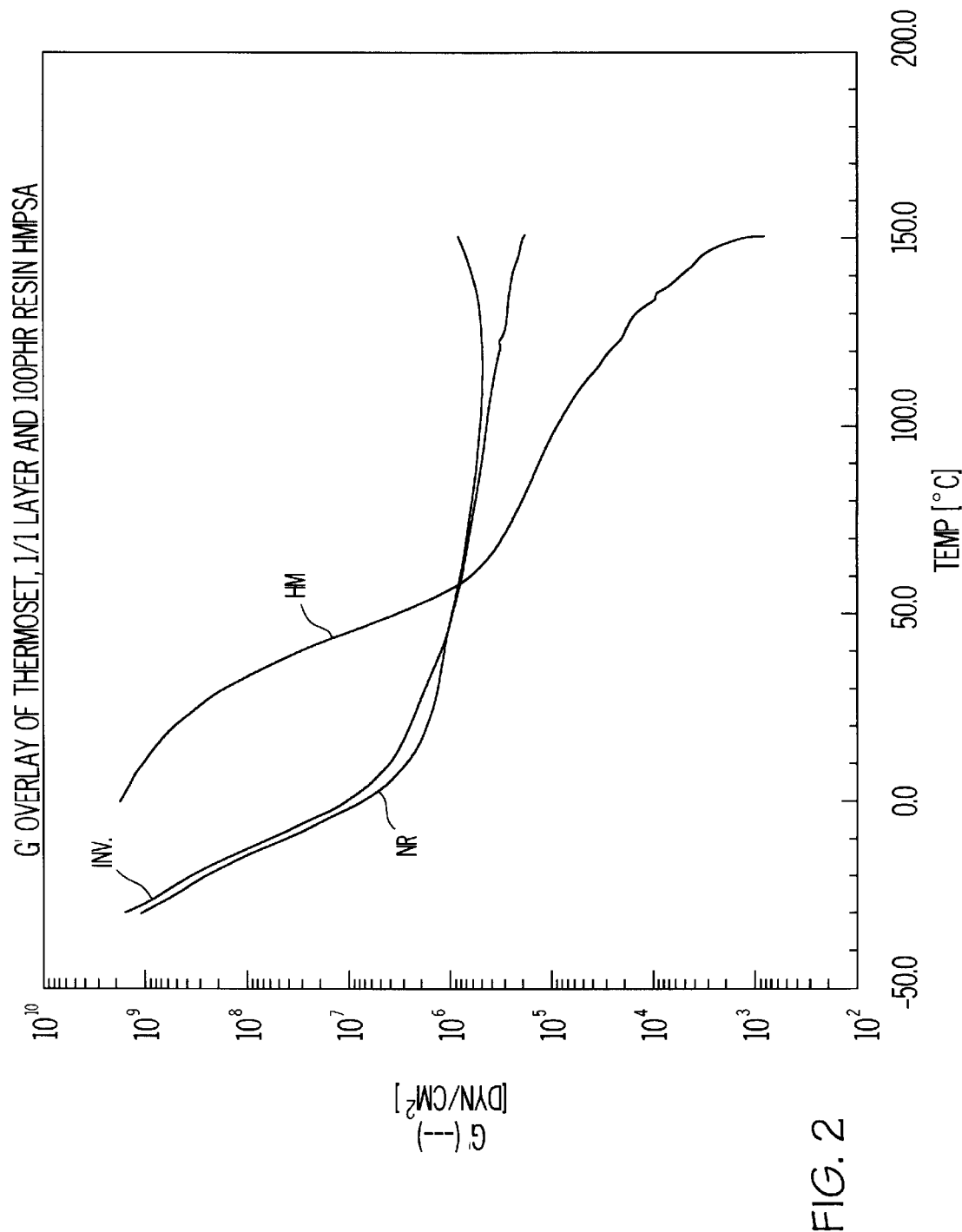
FIGS. 2 and 5 are graphs of G' versus temperature for a bilayer adhesive in accordance with the invention (curve Inv.), a natural rubber adhesive layer (NR), and a layer of an HMPSA (curve HM).
Figure 3:
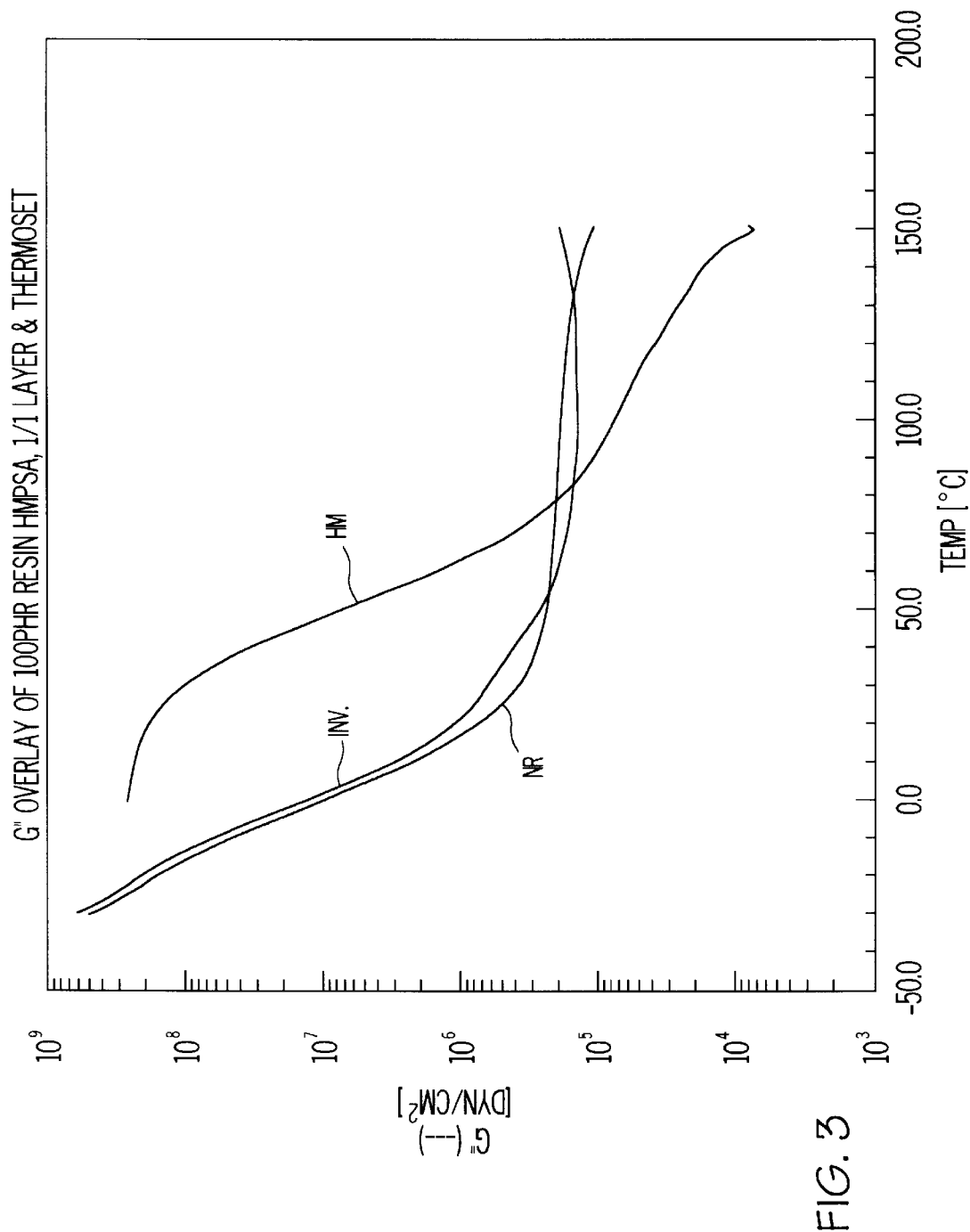
FIGS. 3 and 6 are graphs of G" versus temperature for a bilayer adhesive in accordance with the invention (curve Inv.), a natural rubber adhesive layer (NR), and a layer of an HMPSA (curve HM).
Figure 4:
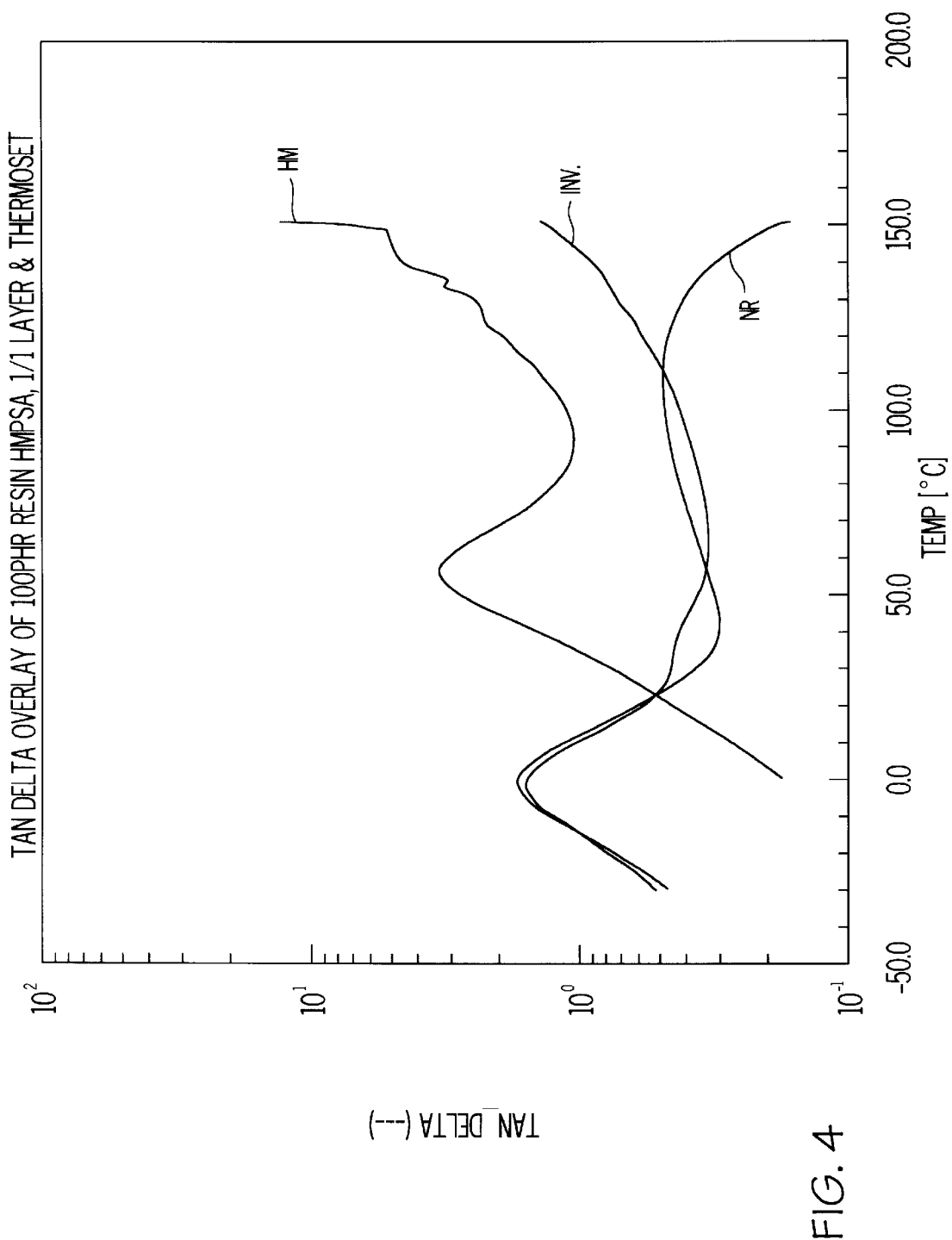
FIGS. 4 and 7 are graphs of tan delta versus temperature for a bilayer adhesive in accordance with the invention (curve Inv.), a natural rubber adhesive layer (NR), and a layer of an HMPSA (curve HM).

FIGS. 2–4 illustrate the correlation in dynamic mechanical properties as represented by G', G" and tan delta versus temperature curves that is obtained in the bilayer structure in accordance with one embodiment of this invention. FIG. 2 is a plot of G' (dyne/$cm^2$) versus temperature for a natural rubber adhesive layer (curve NR), a bilayer in accordance with the invention of an HMPSA foundation layer and a natural rubber overcoat where the HMPSA contains 100 parts of the tackifying resin in 100 parts SIS block copolymer (curve Inv.) and a HMPSA layer (curve HM). While the curves for the bilayer and natural rubber layers are closely aligned, the HMPSA curve is not. FIGS. 3 and 4 show the corresponding curves for G" and tan delta where the curve HM is for the HMPSA composition alone, the NR curve is the natural rubber adhesive composition alone and the Inv. curve is the bilayer.

Figure 5:
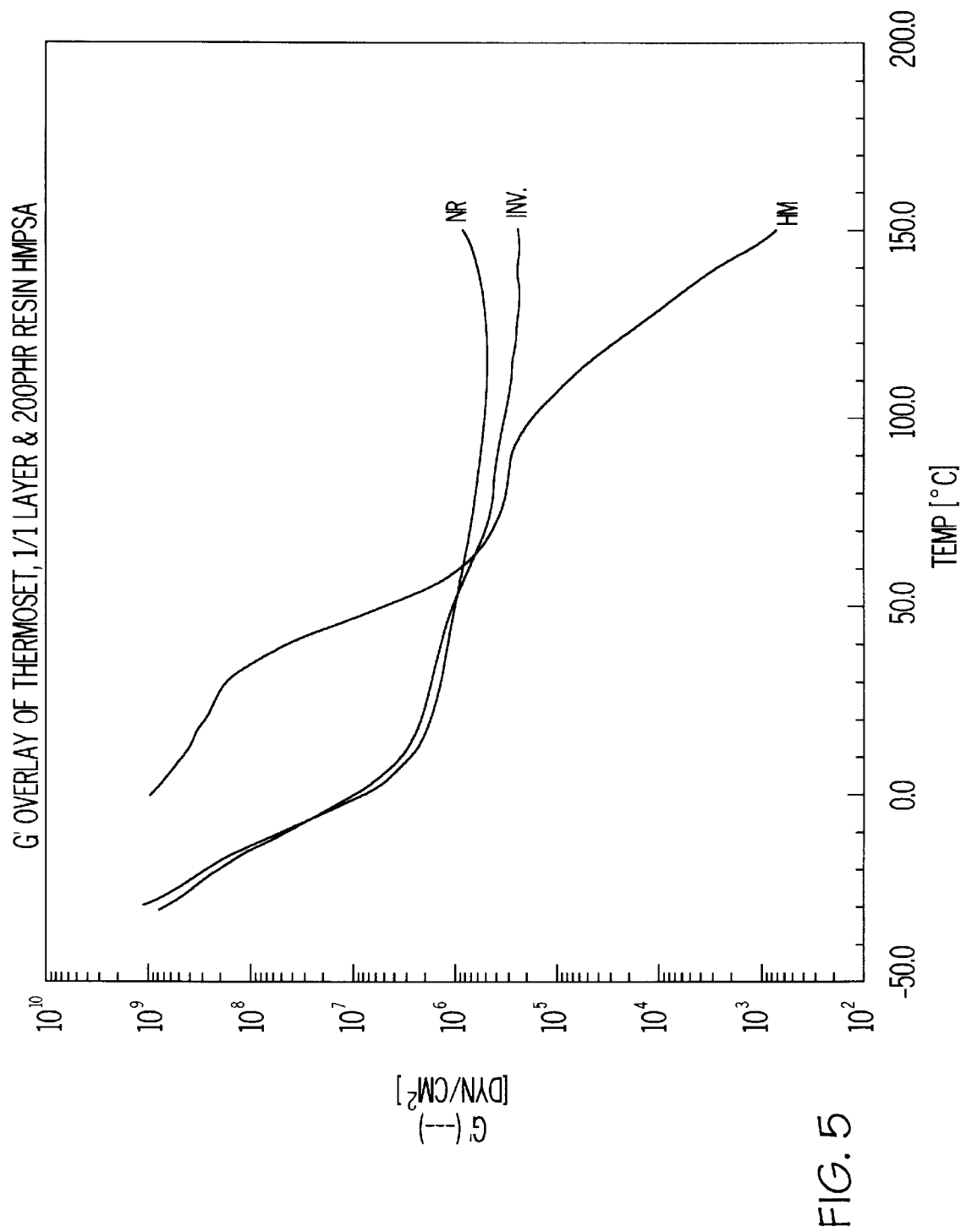
Figure 6:
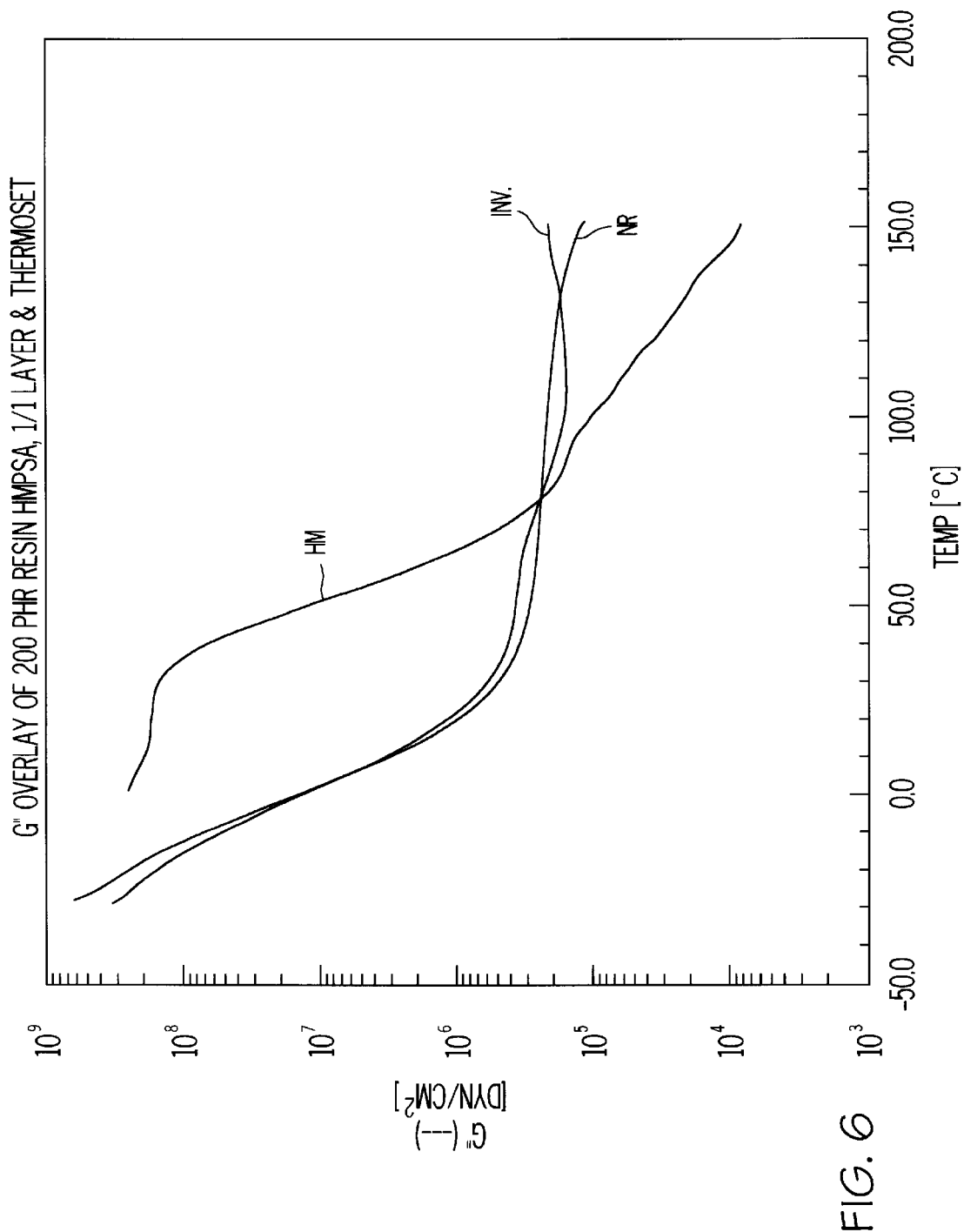
Figure 7:
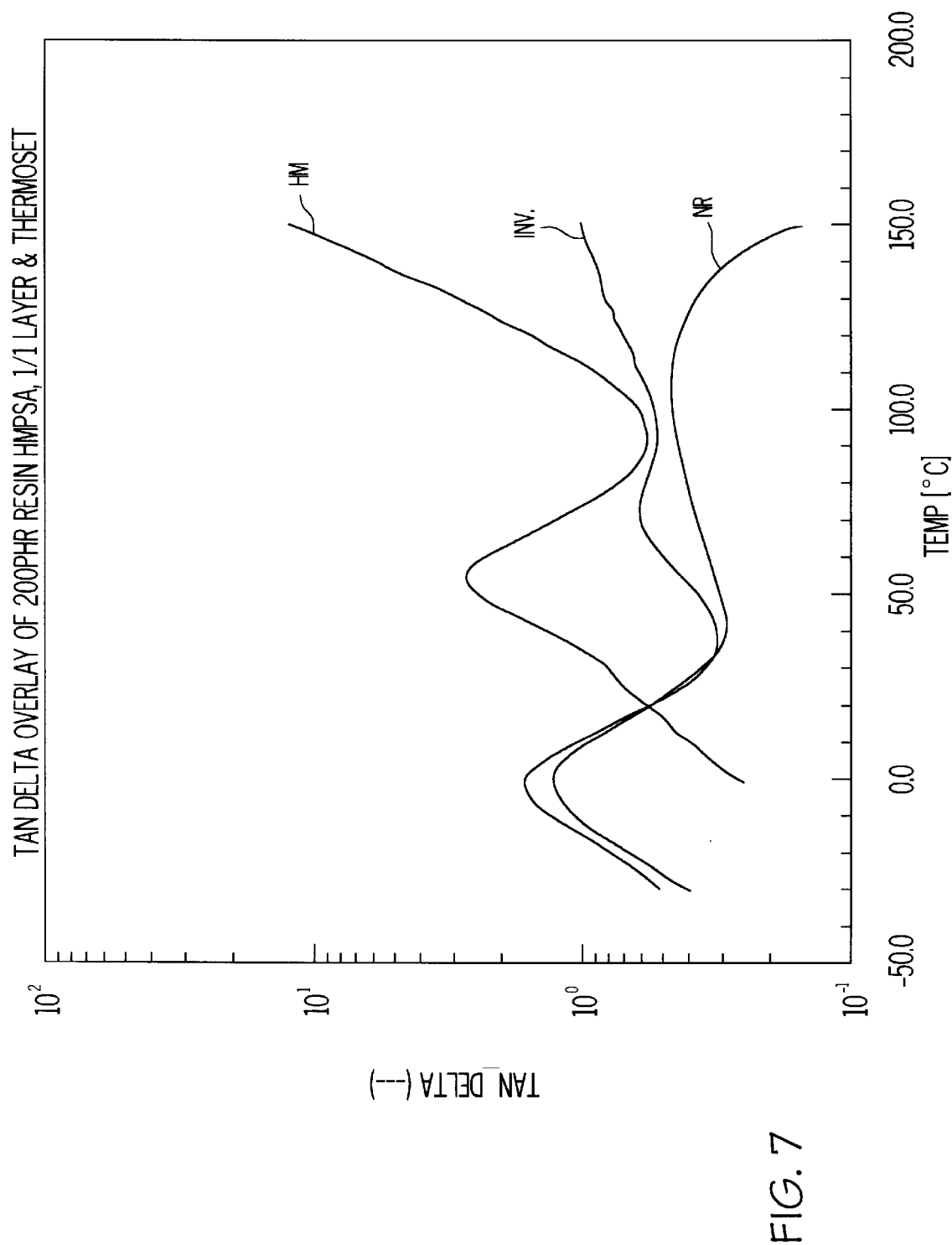

FIGS. 5–7 are curves for G', G" and tan delta for a natural rubber adhesive layer (curve NR), an HMPSA layer containing 200 parts tackifying resin per 100 parts SIS block copolymer (curve HM) and a bilayer (curve Inv.) of the two in accordance within the invention. It will be noted that there is close correspondence in the NR and Inv. curves for G' and G" and that there is substantial correspondence in tan delta. In the table below, 90° and 160° static peel test results are provided for the individual natural rubber and HMPSA layers and the bilayer of the invention. The static results confirm the DMA results and show that the bilayer behaves similar to a natural rubber adhesive layer.

FIG. 7

| Adhesive System | 90° Static Peel | 160° Static Peel |
| --- | --- | --- |
| Natural Rubber | 10/16" | 12/16" |
| BiLayer (100/100) | 15/16" | 22/16" |
| HMPSA (100/100) | 43/16" | X > 3" |

The preferred coat weight of the thermoplastic foundation layer is about 10–40 lbs/ream (3000 ft$^2$). The preferred coating method is a hot melt slot orifice coater where the hot melt pressure sensitive adhesive is metered through a thin slot and deposited onto the support.

The natural rubber-based pressure sensitive adhesive is a natural rubber compounded with a tackifying resin, an antioxidant and a crosslinking additive. The natural rubber-based pressure sensitive adhesive is typically cast from toluene at about 20–50% concentration. To prepare the adhesive, natural rubber elastomer is processed in a Banbury to reduce the molecular weight of the elastomer. Activators such as zinc oxide and extenders such as clay and calcium carbonate are added to the elastomer in the Banbury in a conventional manner. The elastomer containing the extenders and activators is typically processed to a Mooney viscosity of about 42, at 212° F. after one minute warm-up and four minutes running time. One hundred parts of the processed elastomer, about 60 to 300 parts of a tackifying resin such as polyterpene resin or a rosin ester, and about 1 to 2 parts of antioxidant are processed in a Baker Perkins and, thereafter, about 4 to 16 parts of a crosslinker such as phenolformaldehyde resin are added. Toluene is added at the end of the mixing cycle to impart the proper viscosity for coating onto the web structure. The preferred coat weight of the natural rubber adhesive is about 10–40 lbs/ream (3000 ft$^2$). The natural rubber-based pressure sensitive adhesive is pumped to the coating line and coated by knife over roll, reverse roll, or slot die coating method.

The natural rubber adhesive layer and thermoplastic foundation layer compositions include one or more compatible tackifying agents which are utilized in an effective amount to promote good adhesion when used in the adhesive layer and to provide the desired dynamic mechanical properties when used in the foundation layer. Various tackifying resins can be utilized which are generally well known to the art and described in the literature. These resins generally include rosin and its derivatives and various hydrocarbon resins. The rosin group comprises rosins, modified rosins and their various derivatives such as esters. The hydrocarbon resin group comprises polyterpenes, synthetic hydrocarbon resins, and various modified or special rosins which are primarily phenolics. Examples of specific rosin tackifiers include gum rosin, wood rosin, tall oil rosin, and the like. Such rosins are generally a mixture of organic acids called rosin acids. The various rosin acids can be reacted with a variety of alcohol to form esters. Examples of specific rosin tackifiers include glycerine rosin ester, e.g., Flocal 85, manufactured by Hercules, Inc.; hydrogenerated pentaerythritol ester, e.g., Pentalyn H, manufactured by Hercules, Inc.; hydrogenated glycerine ester, e.g., Staybelite Ester 10, manufactured by Hercules, Inc.; modified tall oil rosin, e.g., Sylvatac RX, manufactured by Sylvachem Corp.; polymerized rosin such as Sylvatac 95, manufactured by Sylvachem Corp., and rosin ester such as Zonester 85, manufactured by Arizona Chemical Co.

Hydrocarbon tackifier resins are low molecular weight polymers derived from crude monomer streams. Hydrocarbon resin streams can be classified as containing primarily aromatic, aliphatic, and diene (cyclic olefin) monomers. Polymerization of such streams is generally carried out using a Lewis acid catalyst or by a free-radical process using heat and pressure. The aromatic hydrocarbon resins generally contain aromatic petroleum resins and resins from coal tar, commonly called coumarone-indene resins. The various aliphatic hydrocarbon resins are produced from light, so called carbon-5 petroleum fractions wherein the principal monomers are cis and trans-piperylene. Other hydrocarbon resins include mixed aliphatic-aromatic resins as well as terpene resins. Tackifier resins are described in more detail in the Handbook of Pressure-Sensitive Adhesive Technology, edited by Donatas Satas, Van Nostrand Rhinehold Company, 1982, Chapter 16, pages 353–369.

Conventional reinforcing strands can be used to prepare the tape. The reinforcing strands are typically fiberglass, nylon, polyester or polyamide such as Kevlar available from DuPont. Preferably, the reinforcing strands are fiberglass strands such as G-150 fiberglass strands. In a preferred aspect of the invention, the reinforcing strands are applied to the tape so that they are oriented in the machine direction.

The function of the laminating adhesive is to bind the reinforcing strands to the support. Any conventional laminating adhesive can be used to adhere the reinforcing strands to the support and, in particular, pressure-sensitive adhesives are useful. Both wet laying and dry laying techniques can be used in assembling the strands with the support. Representative examples of this adhesive include acrylic emulsion adhesives such as a butylacrylate, ethylacrylate, or 2-ethylhexylacrylate pressure-sensitive adhesives or pressure sensitive adhesives containing a combination thereof. In one embodiment of the invention, the laminating resin is an acrylic emulsion sold under the designation Rhobond PS-90 or Rhobond PS-99 from Rohm and Haas. The laminating adhesive is applied in an amount of 2 to 15 lbs/ream.

In a typical example of the reinforced strapping tape of the present invention, a 1.42 mil polyethylene terephthatlate (PET) backing is coated on one surface with a molecular layer of polyvinyl octadecyl carbamate (PVODC) and on the opposite surface with 5 dry lbs/ream of acrylic emulsion adhesive. Thirty ends per inch (epi) of G-150 fiberglass strands are applied to the top of the acrylic layer and then overcoated with 25 lbs/ream of hot melt pressure sensitive adhesive at 600 fpm. The hot melt pressure sensitive adhesive is then coated with 20 dry lbs/ream of a natural rubber-based pressure sensitive adhesive in a second machine pass at 375 fpm, wherein the natural rubber-based pressure sensitive adhesive is covalently bonded to the styreneisoprene-styrene elastomer in the hot melt pressure sensitive adhesive.

Having described the invention in detail and by reference to the particular embodiments thereof, it will be apparent that numerous modifications and variations are possible without departing from the scope of the invention as defined by the following claims.

What is claimed is:

1. An adhesive tape comprising:

a support having a first surface and a second surface;

a layer comprising a release agent applied to said first surface of said support;

a foundation layer comprising a hot melt composition containing a thermoplastic resin applied to said second surface of said support; and a layer of a natural rubber pressure sensitive adhesive on said foundation layer.

2. The adhesive tape of claim 1 wherein said foundation layer includes a thermoplastic rubber.

3. The adhesive tape of claim 1 wherein said foundation layer is a hot melt pressure sensitive adhesive.

4. The tape of claim 2 wherein said foundation layer is applied at a coat weight of about 10 to 40 lbs/ream.

5. The tape of claim 1 wherein said natural rubber-based pressure sensitive adhesive is applied at a coat weight of about 10 to 40 lbs./ream (3000 ft$^2$).

6. The tape of claim 1 wherein said foundation layer is formulated such that a bilayer of said foundation layer and said natural rubber adhesive exhibits dynamic mechanical properties substantially similar to those of said natural rubber adhesive layer.

7. The tape of claim 6 wherein the G' profiles versus time for the natural rubber adhesive layer and the combination of the natural rubber adhesive layer and the foundation layer are substantially similar.

8. A reinforced strapping tape comprising:

a support having a first surface and a second surface;

a layer comprising a release agent applied to said first surface of said support;

a first adhesive layer comprising a laminating adhesive applied to said second surface of said support;

a layer of reinforcing strands applied on said first adhesive layer;

a second adhesive layer comprising a hot melt pressure sensitive adhesive applied on said reinforcing strands; and a third adhesive layer comprising a natural rubber pressure sensitive elastomer adhesive applied on said second adhesive layer.

9. The tape of claim 8 wherein said release agent is selected from the group consisting of polyvinyl octadecyl carbamate; a $C_{14}$–$C_{18}$ fatty acid coordinated with a transition metal; the reaction product of a di-ω-organo functional dimethylsiloxane oligomer, a carboxyl group-bearing monomer and a diisocyanate, said di-ω-organo functional dimethylsiloxane having a terminal active hydrogen; and terpolymers of stearyl methacrylate, acrylonitrile, and vinyl pyrrolidone.

10. The tape of claim 8 wherein said hot melt pressure sensitive adhesive comprises a thermoplastic block copolymer selected from the group consisting of styrene-isoprene-styrene block copolymer, styrene-butadiene-styrene block copolymer, and styrene-polyethylene/butylene-styrene block copolymer.

11. The tape of claim 10 wherein said hot melt pressure sensitive layer contains a thermoplastic block copolymer and a tackifying resin.

12. The tape of claim 11 wherein said hot melt pressure sensitive adhesive includes about 80 to 300 parts of said tackifying resin.

13. The tape of claim 8 wherein said laminating adhesive includes an acrylic emulsion adhesive.

14. The tape of claim 8 wherein said reinforcing strands are oriented in the machine direction.

15. The tape of claim 8 wherein said natural rubber-based pressure sensitive elastomer adhesive comprises natural rubber and a tackifier.

16. The tape of claim 8 wherein said hot melt pressure sensitive adhesive is applied at a coat weight of about 10 to 40 lbs/ream (3000 ft$^2$).

17. The tape of claim 8 wherein said natural rubber-based pressure sensitive adhesive is applied at a coat weight of about 10 to 40 lbs./ream (3000 ft$^2$).

18. A reinforced strapping tape comprising:

a support having a first surface and a second surface;

a layer comprising a release agent applied to said first surface of said support;

a first adhesive layer comprising a laminating adhesive applied to said second surface of said support;

a layer of reinforcing strands applied on said first adhesive layer;

a second adhesive layer of a hot melt pressure sensitive adhesive applied on said reinforcing strands; and a third adhesive layer comprising a natural rubber pressure sensitive elastomer adhesive applied on said second adhesive layer, wherein said hot melt pressure sensitive adhesive layer contains a thermoplastic block copolymer and a tackifying resin, said hot melt pressure sensitive adhesive is applied at a coat weight of about 10 to 40 lbs/ream and said natural rubber-based pressure sensitive adhesive is applied at a coat weight of 10 to 40 lbs/ream.

* * * * *